No. 644,422. Patented Feb. 27, 1900.
E. GREENWOOD.
CHECK VALVE.
(Application filed July 10, 1899.)
(No Model.)
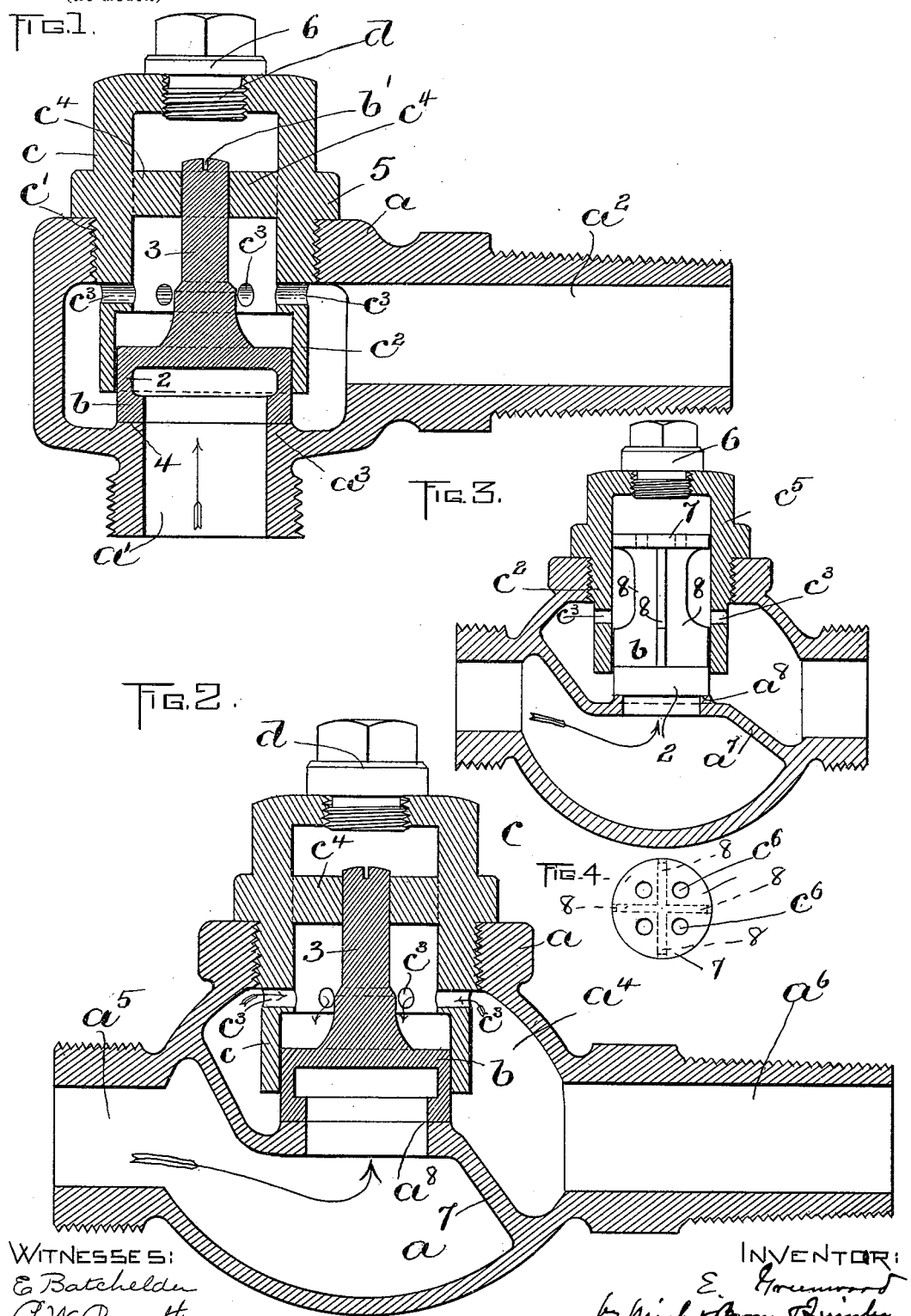

UNITED STATES PATENT OFFICE.

EDWARD GREENWOOD, OF PHILLIPS, MAINE.

CHECK-VALVE.

SPECIFICATION forming part of Letters Patent No. 644,422, dated February 27, 1900.

Application filed July 10, 1899. Serial No. 723,260. (No model.)

*To all whom it may concern:*

Be it known that I, EDWARD GREENWOOD, of Phillips, in the county of Franklin and State of Maine, have invented certain new and useful Improvements in Check-Valves, of which the following is a specification.

This invention relates to check-valves for employment in the boiler-feed pipes of locomotives and for other purposes; and it has for its object to simplify the construction of these devices and also to provide improved guiding means for the valve or plunger with a view to insuring its positive operation.

The invention consists in the novel features of construction and arrangement of parts, which I shall now proceed to describe and claim.

Of the accompanying drawings, Figure 1 represents a sectional view of an angle check-valve embodying my invention. Fig. 2 represents a similar view showing a straight check-valve embodying my invention. Fig. 3 represents a sectional view showing a modification. Fig. 4 represents a detail view, hereinafter referred to, of the valve in said modification.

Referring at first to Fig. 1 of the drawings, $a$ designates the casing of the valve, having inlet and outlet branches $a'$ and $a^2$ exteriorly threaded for coupling to the feed-pipe or other pipe and located at right angles to each other. At the inner end of the inlet branch $a'$, within the casing, is formed an annular flat valve-seat $a^3$, and above said seat is mounted the valve $b$, which is adapted to have a limited vertical movement, so as to open and close on said valve-seat. The valve $b$ is formed with a relatively-large cylindrical lower body 2, the lower edge of which is ground flat to fit against the flat valve-seat $a^3$, the body being hollow, as shown, giving the valve an inverted-cup shape. Above the body 2 the valve is formed with a reduced cylindrical stem 3.

$c$ represents a combination cap, valve, cage, and guide having an exterior screw-thread $c'$ formed on its intermediate portion which screws into a threaded opening in the casing $a$ opposite the inlet branch $a'$, and provided above said threaded portion with an annular shoulder 5, which screws down against the upper edge of the valve-casing $a$ when the cap $c$ is fitted in place. Below the threaded portion $c'$ the cap is provided with an annular sleeve-like extension $c^2$, which projects within the casing and closely surrounds the large cylindrical body 2 of the valve $b$, so as to form a guiding-bearing for said body during the vertical movements of the valve. The extension $c^2$ is provided above its valve-guiding portion with a series of ports or apertures $c^3$ $c^3$, which permit the passage of fluid from the interior of the valve-casing into the central portion of the cap $c$ behind the valve, whereby the water or other fluid backing up in the outlet branch $a^2$ normally operates to close the valve against its seat.

At $c^4$ $c^4$ in the upper portion of the cap $a$ are formed integrally with the cap a series of transverse cross-arms meeting in the center and vertically apertured to form a guiding-bearing for the valve-stem 3. Opposite the end of said valve-stem the cap $c$ is provided with a threaded opening, in which is fitted a screw-plug $d$, having a shoulder 6, which screws down against the top of the cap and squared at its outer end for engagement with a wrench. The purpose of this plugged opening is to give access to the end of the valve-stem when the valve is to be ground to reseat it. This grinding is commonly performed by placing a suitable abrasive substance between the flat-bottomed valve and its seat and imparting a rotary movement to the valve, so as to grind and true up the abutting faces on the valve and its seat. The upper end of the valve-stem is suitably formed for engagement with a rotating tool, which is inserted through the opening in the top of the cap $c$ after the plug $d$ has been removed. I have shown the top of the valve-stem as formed with a slot $b'$ for engagement with a rotating tool, such as a screw-driver. During the grinding of the valve the guiding portions of the cap $c$ maintain the valve in its correct position.

It will be noted that the construction described provides an ample bearing for the valve, both on its body and on its stem, at widely-separated points. There is, therefore, no liability of the valve canting to one side and sticking in an open position. The number of parts is reduced to a minimum in my construction, their arrangement is simple, the parts are easy of access, and the cost of manufacturing the valve is relatively small.

The invention is applicable to either angle valves or straight valves. In Fig. 2 I have shown a form of straight valve in which the inlet and outlet branches $a^5$ and $a^6$ are in line with each other, and the central chamber within the casing is divided by a diagonal transverse partition $a^7$, having a central aperture surrounded by a flat valve-seat $a^8$, against which the flat-bottomed valve $b$ abuts. The remaining structure of the valve is similar to that described in connection with Fig. 1.

In Figs. 3 and 4 is represented a modification wherein the valve $b$ is provided with an enlarged cylindrical lower body 2, as before, and also with an upper cylindrical head or disk 7 of substantially the same diameter as the lower valve-body and connected with the latter by the webs or wings 8 8. Said webs and the head 7 constitute the stem of the valve, the webs forming a reduced portion of said stem. The cap $c^5$ is provided, as before, with the sleeve-like cage or extension $c^3$, guiding the cylindrical lower valve-body 2 and apertured at $c^3$ $c^3$, above said body, to permit the passage of fluid through the cage to the back of the valve, and the head 7 is, furthermore, formed with vertical apertures $c^6$ $c^6$ between the webs 8 8, as shown in detail in Fig. 4, to allow for the access of fluid to the valve above said head. The upper portion of the cap $c^5$ is bored out to substantially the same inner diameter as its extension $c^2$ to fit and form a guiding-bearing for the cylindrical head 7 of the valve-stem.

I claim—

1. A check-valve comprising a casing containing a flat valve-seat and having inlet and outlet branches, and an independent threaded opening, a valve adapted to abut against said seat and having a cylindrical lower body having its lower edge ground flat and a stem reduced above said body, said stem being formed for engagement by a tool whereby it may be rotated, a combined cap, cage, and guide screwed into said threaded opening and having an annular extension or cage inside the valve-casing, surrounding and guiding the lower body of the valve and apertured back of said valve-body for the passage of fluid, and also having a bearing near its outer portion for the upper part of the valve-stem, and a screw-plug fitted into the said cap in alinement with the end of the valve-stem, to afford access to said stem with a tool.

2. A check-valve comprising a casing containing a flat valve-seat and having inlet and outlet branches, and an independent opening, a valve adapted to abut against said valve-seat and having a relatively-wide cylindrical body having its lower edge ground flat and a reduced stem, said stem being formed for engagement by a tool whereby it may be rotated, a combined cap, cage, and guide screwed into said threaded opening and having an annular extension or cage inside the valve-casing, surrounding and guiding said valve-body, and apertured back of the valve-body for the passage of fluid, and also having a bearing near its outer portion surrounding and guiding the valve-stem, and a screw-plug fitted into the said cap in alinement with the end of the valve-stem, to afford access to said stem with a tool.

In testimony whereof I have affixed my signature in presence of two witnesses.

EDWARD GREENWOOD.

Witnesses:
J. B. NOBLE,
HARRY F. REEDY.